(12) United States Patent
Knauff

(10) Patent No.: US 7,808,136 B2
(45) Date of Patent: Oct. 5, 2010

(54) COOLING DEVICE FOR AN ELECTRICAL MACHINE, ELECTRICAL MACHINES HAVING A COOLING DEVICE SUCH AS THIS, CORE LAMINATE AND PRODUCTION METHOD FOR SUCH ELECTRICAL MACHINES

(75) Inventor: Axel Knauff, Münnerstadt (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 12/278,501

(22) PCT Filed: Feb. 5, 2007

(86) PCT No.: PCT/EP2007/051057

§ 371 (c)(1),
(2), (4) Date: Aug. 6, 2008

(87) PCT Pub. No.: WO2007/090803

PCT Pub. Date: Aug. 16, 2007

(65) Prior Publication Data

US 2009/0026858 A1    Jan. 29, 2009

(30) Foreign Application Priority Data

Feb. 6, 2006   (DE) .................. 10 2006 005 316

(51) Int. Cl.
*H02K 9/00* (2006.01)
*H02K 1/18* (2006.01)
*H02K 3/34* (2006.01)

(52) U.S. Cl. .................... 310/59; 310/52; 310/218; 310/215

(58) Field of Classification Search ............. 310/52, 310/59, 215–218
See application file for complete search history.

(56) References Cited

U.S. PATENT DOCUMENTS 2,338,154 A * 1/1944 Wilkinson .................. 310/54

(Continued)

FOREIGN PATENT DOCUMENTS

DE    14 88 657 A1    6/1969

(Continued)

OTHER PUBLICATIONS

Derwent Text Translation JP59194644A (1984).*

*Primary Examiner*—Quyen Leung
*Assistant Examiner*—Jose A Gonzalez Quinones
(74) *Attorney, Agent, or Firm*—Henry M. Feiereisen; Ursula B. Day

(57) ABSTRACT

The invention relates to a cooling device for an electric machine, in particular, for an electric motor comprising a stator (2) and a rotor. According to the invention, axial channeled recesses (6) are provided on the outside of the stators (2), in which a cooling tube or cooling hose may be introduced and/or which may be sealed by means of a cover (10) to give a cooling air channel, an electric motor with such a cooling device and a core sheet (4) for a lamination bundle of a stator (2), the core sheet (4) comprising amongst other things a number of stator grooves (5). The core sheet (4) comprises recesses (6) with a channel cross-section on the outer edge thereof. The invention further relates to an electric machine the stator (2) of which has a lamination bundle made up of a plurality of such core sheets (4). The invention also relates to a production method for such electric machines. The cooling tubes or cooling hoses can be simply inserted in the half-open channeled recesses from without for cooling.

14 Claims, 4 Drawing Sheets

U.S. PATENT DOCUMENTS

Figure 1:
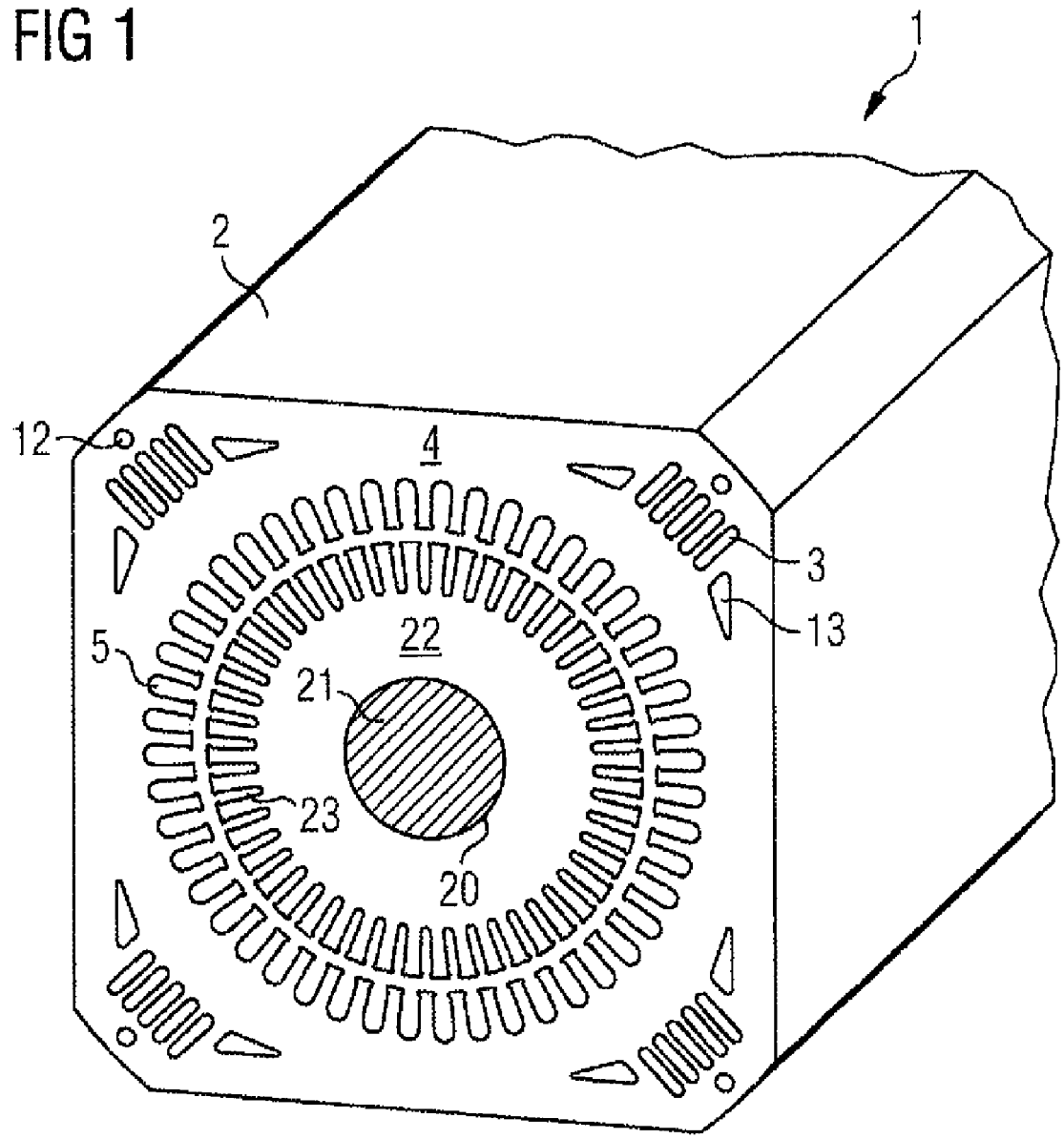

| | | | |
|---|---|---|---|
| 3,106,654 A * | 10/1963 | Wesolowski | 310/61 |
| 3,414,749 A * | 12/1968 | Abegg | 310/52 |
| 4,182,966 A | 1/1980 | Hammer | |
| 4,839,545 A | 6/1989 | Chitayat | |
| 2004/0012272 A1 | 1/2004 | Houle | |

FOREIGN PATENT DOCUMENTS

| | | |
|---|---|---|
| DE | 31 30 515 A1 | 6/1982 |
| DE | 41 07 399 A1 | 9/1992 |
| DE | 196 04 643 A1 | 8/1997 |
| DE | 197 49 108 C1 | 4/1999 |
| DE | 100 53 596 A1 | 5/2002 |
| FR | 2 239 798 A1 | 2/1975 |
| JP | 59194644 A * | 11/1984 |
| WO | WO 02/078150 A2 | 10/2002 |

* cited by examiner

COOLING DEVICE FOR AN ELECTRICAL MACHINE, ELECTRICAL MACHINES HAVING A COOLING DEVICE SUCH AS THIS, CORE LAMINATE AND PRODUCTION METHOD FOR SUCH ELECTRICAL MACHINES

The invention relates to a cooling device for an electrical machine having a stator and a rotor, and to an electrical machine having a cooling device such as this. The invention also relates to a core laminate for a laminated core of a stator of an electrical machine, with the core laminates having a circular cutout for a rotor of the electrical machine and a multiplicity of stator slots. The invention relates to an electrical machine which has a stator and a rotor, with the stator having a laminated core comprising a multiplicity of such core laminates. In particular, the electrical machine is an electric motor. Finally, the invention relates to a production methods for such electrical machines.

It has been known for a long time for electrical machines such as electric motors or generators to be cooled with a gaseous or liquid medium. Air is preferably used as a gaseous medium, and water as a liquid medium. Electrical machines such as these may be self-cooled or externally cooled. In the case of air cooling, these are referred to as self-ventilated or externally ventilated electrical machines.

In the case of self-ventilated machines, the electrical machine is typically cooled by means of an impeller which is seated on one shaft end of the electrical machine. In the case of externally ventilated electrical machines, this is done by means of a separate fan which produces a cooling air flow independently of the speed of revolution of the electrical machine. In order to cool the electrical machine, the air can be passed through the air gap between the stator and rotor and through cooling air ducts which run axially in the stator and/or in the rotor.

In the case of liquid cooling, water is typically used as the cooling medium and is passed through metallic tubes, for example through copper or steel tubes. The tubes may be laid in a meandering shape through the stator of the electrical machine. For this purpose, each of the cooling tubes is connected at the two end faces of the electrical machine to direction-changing devices, for example to a U-tube or a direction-changing chamber. Furthermore, a cooling water inlet and a cooling water outlet are also provided. The heated cooling water is passed to a heat exchanger or back-cooler, via which the majority of the waste heat from the electrical machine can be dissipated to the surrounding area.

The stator of an electrical machine is normally formed from laminates in order to minimize the eddy current losses that occur on excitation. This stator is for this purpose in the form of a laminated core composed of a multiplicity of thin core laminates stacked axially. The rotor can likewise be in the form of a laminated core. Appropriate cutouts, preferably in the form of stamped-out areas, are provided in order to cool the electrical machine, in particular in the laminate section of a stator core laminate. The stamped-out areas may, for example, be circular, rectangular or triangular. Once the laminated core has been assembled, axially running cooling ducts are formed, through which, for example, air can be passed for cooling.

If the electrical machine uses liquid cooling, metal tubes can be fitted into the ducts created by the stamped-out areas, with the diameter of the generally circular metal tubes being slightly smaller than the diameter of the corresponding circular stamped-out areas in the core laminate. This ensures that heat is transferred well between the laminated core and the cooling liquid.

Liquid cooling is preferably used when electrical machines are operated close to their rating limit, that is to say the thermal power loss to be dissipated is comparatively high. The electrical rating of such motors is typically more than 5 kW. Liquid-cooled electrical machines are also quieter during operation since no fans are required. In contrast, the technical complexity for liquid cooling is considerably greater than that of air cooling.

Different housings are used for the electrical machines, depending on the type of cooling. In the case of electrical machines without housings, both cooling types can also be taken into account by a suitable laminate cut of the core laminates. For example, in the case of liquid cooling, cooling tubes with a preferably circular cross section can be introduced into corresponding ducts in the laminated core. In the case of air cooling, air flows through the ducts. Depending on the type of cooling, particularly in the case of liquid cooling, suitable direction-changing devices or direction-changing chambers may also be provided on the end faces of the electrical machine. The number of cooling tubes laid in the stator of an electrical machine may be in the range of single digits or double digits.

The disadvantage in this case is that, in the case of liquid cooling, a multiplicity of tube connections are required in order to connect the large number of cooling tube ends in a sealed form, from the hydraulic point of view. In the case of copper tubes, for example, this can be done by means of a soldered joint or screw joint. The production of a cooling device such as this is correspondingly complex.

Furthermore, there is a risk of leaks because of the large number of tube connections. In the event of a leak, liquid can enter the electrical machine, and can damage it. The replacement for the damaged components that is then required is feasible only with a large amount of effort, because of the connected tube parts of the cooling device.

A final disadvantage is the large number of components themselves which are required for production of a cooling system such as this.

One object of the invention is to specify a cooling device of simple design for an electrical machine.

A further object of the invention is to specify a cooling apparatus which is suitable for both liquid and air cooling.

A further object of the invention is to specify a suitable core laminate for an electrical machine, which allows simplified cooling of the electrical machine.

Another object of the invention is to specify an electrical machine having a cooling device such as this, and an electrical machine having a laminated core composed of a multiplicity of such core laminates.

A final object of the invention is to specify production methods for an electrical machine such as this.

According to one aspect of the invention, this object is achieved by a cooling device for an electrical machine having a stator and a rotor, with cutouts in the form of grooves running essentially axially on the outside of the stator, includes at least one cooling tube or one flexible cooling tube for insertion into the cutouts, and/or at least one cover for closure of the cutouts to form a cooling air duct.

According to another aspect of the invention, the object is also achieved by a core laminate for a laminated core of a stator of an electrical machine, with the core laminate having a circular cutout for a rotor of the electrical machine and having a multiplicity of stator slots, wherein the core laminate has cutouts with a cross section in the form of grooves at its outer edge.

According to the invention, cutouts which are in the form of grooves and run essentially axially are provided on the outside of the stator, into which at least one cooling tube or one flexible cooling tube can be inserted and/or which can be closed by means of at least one cover to form a cooling air duct.

The expression the outside of the stator refers in particular to the casing surface of the electrical machine, that is to say the surface enclosed between the end surfaces of the electrical machine. The cutouts which are in the form of grooves preferably run in the axial direction, that is to say parallel to the rotation axis of the rotor.

The particular advantage of the invention is the simple design of the cooling device. In the case of liquid cooling, only the cooling tube or the flexible cooling tube may be introduced from the outside into the respective cutout, which is in the form of a groove, for this purpose. The cooling tube or the flexible cooling tube may then, for example, be snapped or pressed in there.

Cooling tubes are mechanically more robust than flexible cooling tubes. At the same time, they have less thermal resistance and as a consequence a better cooling capability. In contrast, flexible cooling tubes can be introduced into the corresponding cutouts more easily.

A further advantage is that a leaky or blocked cooling tube or a leaky or blocked flexible cooling tube can be replaced easily.

A further advantage is that the cooling liquid can flow away over the outside of the stator, unpressurized, in the event of leaks. In consequence, the cooling liquid does not enter the interior of the electrical machine.

In the case of air cooling, cooling air ducts are advantageously provided in a simple manner in that the cutouts which are in the form of grooves are closed by means of at least one cover to form a cooling air duct. Each cooling air duct is preferably covered such that the covers end virtually flush with the outer surface of the stator. For example, the covers can be latched or clamped into the cutouts which are in the form of grooves and, for example, can be manufactured from a plastic or from a metal.

Furthermore, it is also possible to use the covers to close cooling tubes or flexible cooling tubes which have been introduced into the cutout that are in the form of grooves, for example for protection against mechanical damage or to ensure they cannot be seen.

One particular advantage is that a single type of electrical machine can be provided not only with liquid cooling and with air cooling but also with a mixed cooling mode, depending on the field of use. This reduces the items that have to be stored. The number of components required is reduced.

In one embodiment of the invention, the cutouts which are in the form of grooves have a U-shaped cross section. Cutouts with a cross section such as this may be introduced from the outside into the stator for example by means of a milling head or a plane. The cutouts which are in the form of grooves preferably run in the axial direction although they may also have a rectangular cross section with chamfers or rounded areas, particularly in the corner area.

The cutouts which are in the form of grooves are, in particular, distributed uniformly over the circumference of the stator. This is advantageous in the case of electrical machines whose stator has a circular cross section. If the cross section is more or less square (see FIG. 1 in this context), it is advantageous for the cutouts which are in the form of grooves to be arranged in the corner area.

In addition, conventional closed cooling air ducts can be provided in the corner area, having a circular triangular or quadrilateral cross section. Cutouts which are in the form of grooves may be adjacent to them. For applications for which air cooling is sufficient, these adjacent cutouts can be closed to form additional cooling air ducts while, in the case of liquid cooling, only the adjacent cutouts which are in the form of grooves are preferably used.

In one advantageous embodiment, the base of the cutouts which are in the form of grooves is semicircular. The cooling tube or the flexible cooling tube has a circular cross section which is matched to the geometry of the cutouts which are in the form of grooves. In consequence, the majority of the cooling tube surface or the flexible cooling tube surface rests directly on the metallic inner face of the cutout which is in the form of a groove. In consequence, the heat transfer resistance is advantageously particularly low and, in consequence, the cooling performance is very high. The thermal resistance can be produced by introducing a thermally conductive substance, for example thermally conductive paste, into the cutout which is in the form of a groove before installation of the cooling tubes or flexible cooling tubes.

In particular, the diameter of the cooling tube or of the flexible cooling tube is only slightly less than the diameter of the cutout. The maximum width of the cutout which is in the form of a groove preferably corresponds to the diameter of the cutout at the base. The depth of the cutout, that is to say the maximum distance between the outside of the stator and the base, is therefore preferably of such a size that the cooling tube or the flexible cooling tube is recessed completely in the cutout. The depth of a cutout is preferably of such a size that the base of a cutout is outside the magnetically active part of the stator.

In a further embodiment of the invention, the side areas of the cutout which is in the form of a groove are formed by walls whose thickness is designed with thin walls such that a cooling tube can be pressed into the respective cutout in the mechanically elastic sense. The words in the mechanically elastic sense mean that no mechanical permanent (plastic) deformation occurs either on the cooling tube or on the walls.

In one particularly preferred embodiment, the cooling tubes or the flexible cooling tubes can be laid at least partially and in meandering shape on the outside of the stator of the electrical machine. This has the particular advantage that, on the one hand, no tube or flexible tube connections are required on the end faces of the electrical machines. There are no connecting points which could become leaky. On the other hand this considerably simplifies the installation of the cooling system. In the simplest case, one continuous cooling tube without any connections, which is bent in a meandering shape, is wound as one component around the stator of the electrical machine, and is introduced into the cutouts which are in the form of grooves. In the case of a flexible cooling tube, this can be laid as an item procured by length in a meandering shape along the circumference of the stator.

A further advantage is that the number of cooling device components is considerably reduced. In the best case, the cooling device comprises the electrical machine with the cutouts which are in the form of grooves and in which the continuous cooling tube or the flexible cooling tube is laid. The final additional item is the connection or connections to a recooling device.

The cutouts which are in the form of grooves may also have axially running slots for insertion of the covers. The covers can simply be pushed in from one end face of the stator. The slots are preferably cut out such that they are located as possible to the outside of the stator. In this case, the covers end virtually flush with the outside of the stator. At the same time, this results in an air duct with a maximum cross-sectional area with respect to the external contour of the stator.

If the covers are in the form of strips, then they can advantageously be pushed as an entity into the slots of a cutout.

According to the invention, an electrical machine such as a generator or in particular an electric motor has a cooling device such as this. An electrical machine such as this advantageously has fewer components than previously known electrical machines. Furthermore, an electrical machine such as this can be produced in fewer manufacture and assembly steps.

The object of the invention is also achieved by a core laminate for a laminated core of a stator of an electrical machine, in which the core laminate has a circular cutout for a rotor of the electrical machine, and a multiplicity of stator slots. According to the invention, the core laminate has cutouts with a cross section in the form of a groove on its outer edge.

The cutouts with the cross section in the form of a groove result during assembly of the stator of the electrical machine in half-open ducts which run essentially axially. These half-open ducts or cutouts in the form of grooves are used to hold at least one cooling tube or flexible cooling tube in the manner already described above.

The cutouts preferably have a U-shaped cross section, and in particular are semicircular. The semicircular part of the cutout is located in an area opposite the outside of the stator. A cooling tube with the corresponding cross section or a flexible cooling tube with a corresponding cross section can be inserted, fitted or snapped into the cutouts which are in the form of grooves, in order to cool the electrical machine. In consequence, the majority of the cylindrical lateral outer surface of the cooling tube or of the flexible cooling tube rests directly on the inside of the cutout which is in the form of a groove.

In one particularly advantageous embodiment, the cross section of the cutouts is widened in the area of the outer edge by at least two mutually opposite further cutouts which each form one slot. Once the stator has been assembled from the multiplicity of core laminates, one or more covers can be pushed into these slots in order to close a cutout which is in the form of a groove and to form a cooling air duct.

The cutouts are preferably introduced into a core laminate by means of a stamping process or by means of a laser cutting process, preferably together with the cutouts for the circular opening of the rotor and the stator slots.

According to the invention, an electrical machine such as a generator or in particular an electric motor has a stator in the form of a laminated core composed of a multiplicity of core laminates. An electrical machine such as this advantageously has fewer components than previously known electrical machines. Furthermore, an electrical machine such as this can be produced in fewer manufacturing and assembly steps.

The object of the invention is also achieved by a method for production of an electrical machine, in particular an electric motor. The electrical machine has a stator and a rotor, with the production method comprising at least the following steps:

a) introduction of cutouts, which run essentially axially and are in the form of grooves, on the outside of the stator of the electrical machine, b) introduction of at least one cooling tube or of a flexible cooling tube into the cutouts and/or c) closure of the cutouts by means of at least one cover to form an cooling air duct.

The production of the electrical machine according to the invention is considerably simpler than that of conventional electrical machines. In particular, the at least one cooling tube of the at least one flexible cooling tube is introduced in one production step or in a small number of production steps into the cutouts, which are in the form of grooves, on the outside of the stator of the electrical machine. Furthermore, this considerably reduces the production time for an electrical machine such as this.

Finally, the object of the invention is achieved by a method for production of an electrical machine, in particular of an electric motor. The electrical machine has a stator and a rotor, with the stator being formed from a laminated core with a multiplicity of core laminates to each of which a circular cutout is introduced for the rotor and a multiplicity of stator slots, with the production method comprising at least the following steps:

a) introduction of cutouts with a cross section in the form of grooves and an outer edge of the core laminate, b) introduction of at least one cooling tube or of a flexible cooling tube into the cutouts and/or c) closure of the cutouts by means of at least one cover to form a cooling air duct.

The production of the electrical machine according to the invention is considerably simpler than that of conventional electrical machines. In particular, suitable cutouts are provided during the manufacture of a core laminate itself, that is to say in the laminate blank, and these cutouts are suitable for holding at least one cooling tube or the at least one flexible cooling tube once the laminated core of the stator has been assembled with the multiplicity of core laminates. Furthermore, this considerably reduces the production time for an electrical machine such as this.

In one particularly advantageous embodiment, the cutouts which are in the form of grooves are introduced into each core laminate by means of a stamping or laser cutting process. These processes allow a particularly fast manufacturing rate.

Finally, it is particularly advantageous if the at least one cooling tube or the at least one flexible cooling tube is laid at least partially in a meandering shape in the cutouts. In the best case, a cooling tube which has already been bent in advance into a meandering shape is fitted, clipped or pressed in along the stator circumference. A plurality of cooling tubes which have already been bent in a meandering shape can also be used, and are introduced successively or overlapping along the stator circumference.

Figure 2:
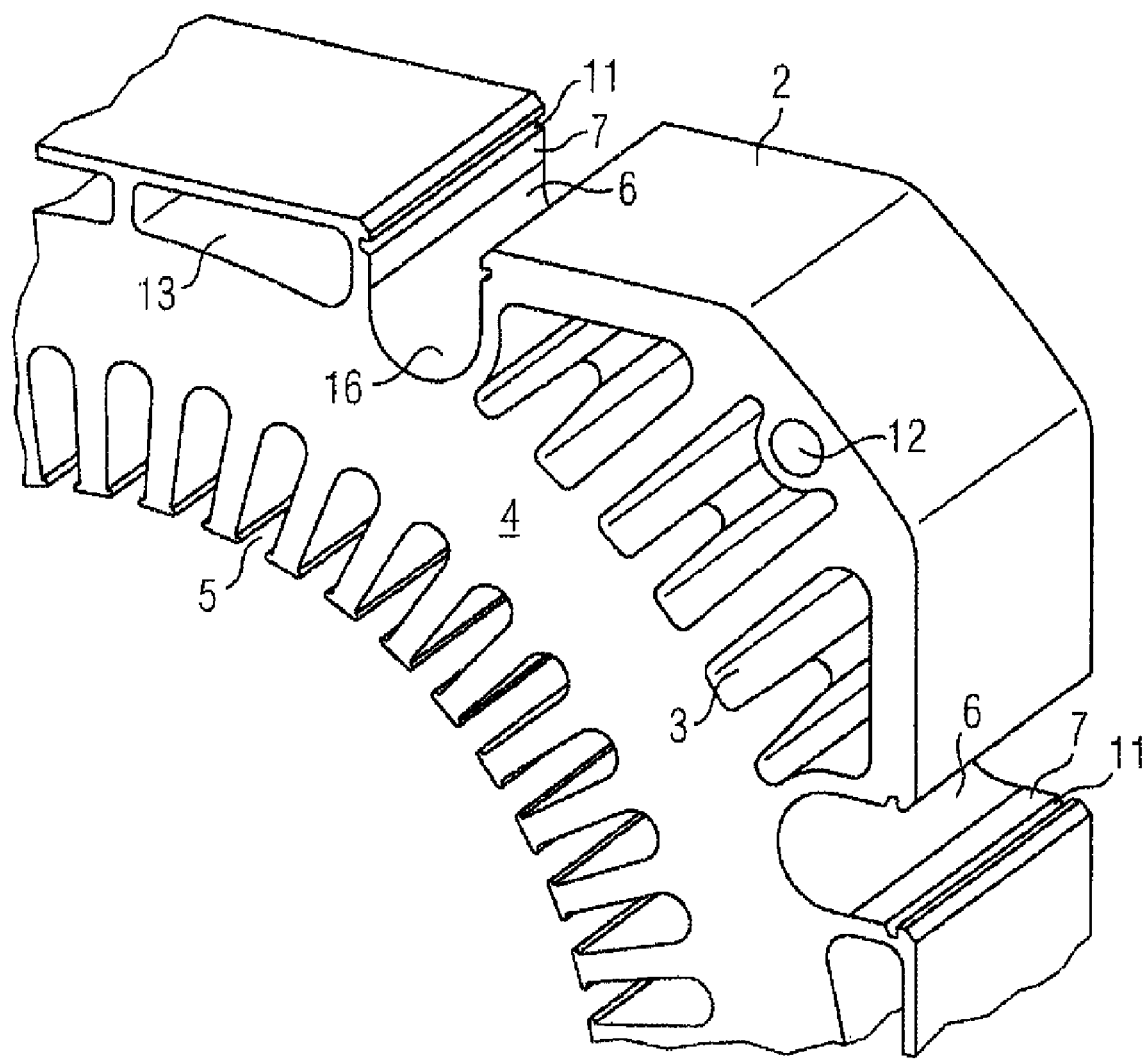
Figure 3:
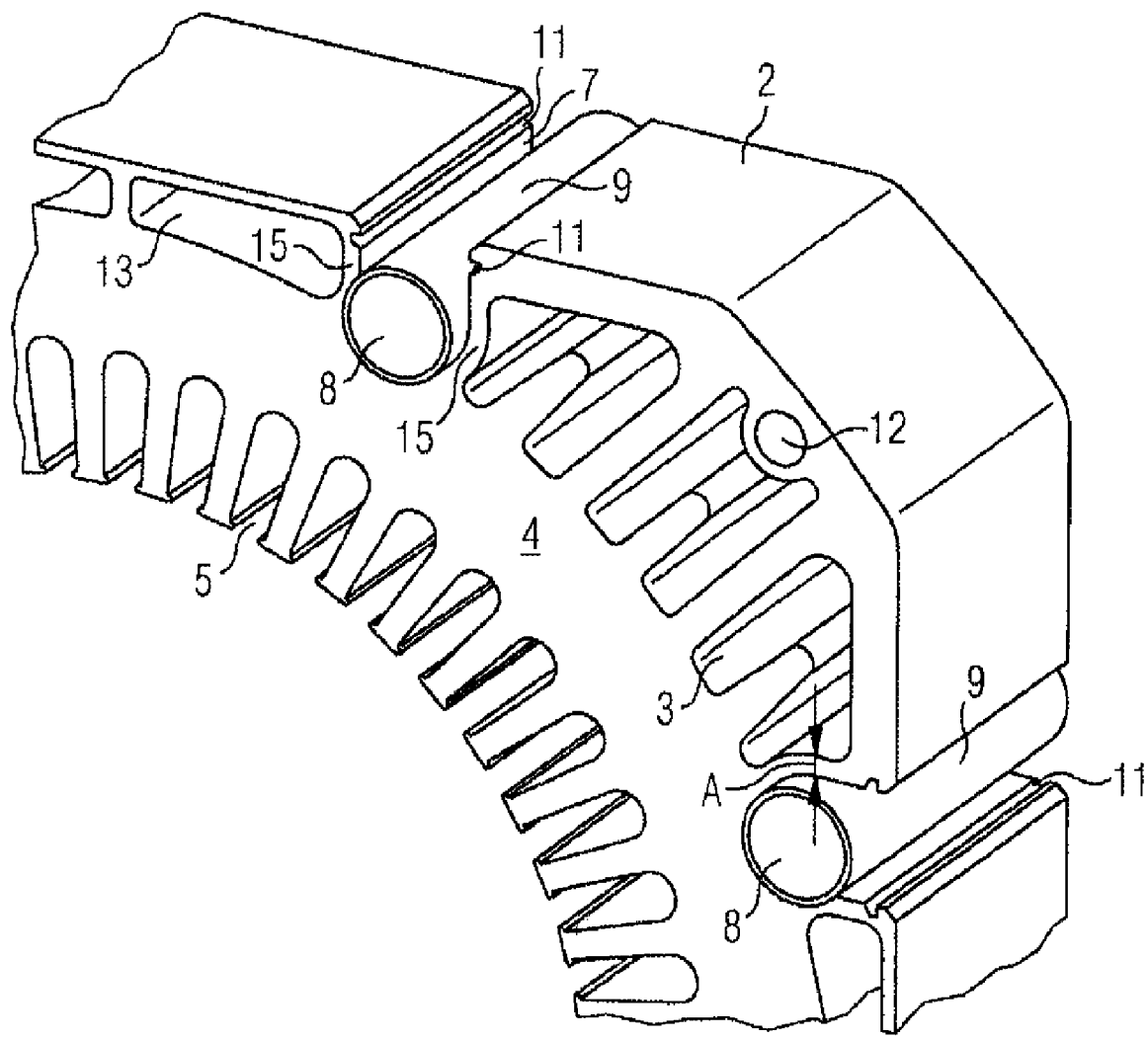
Figure 4:
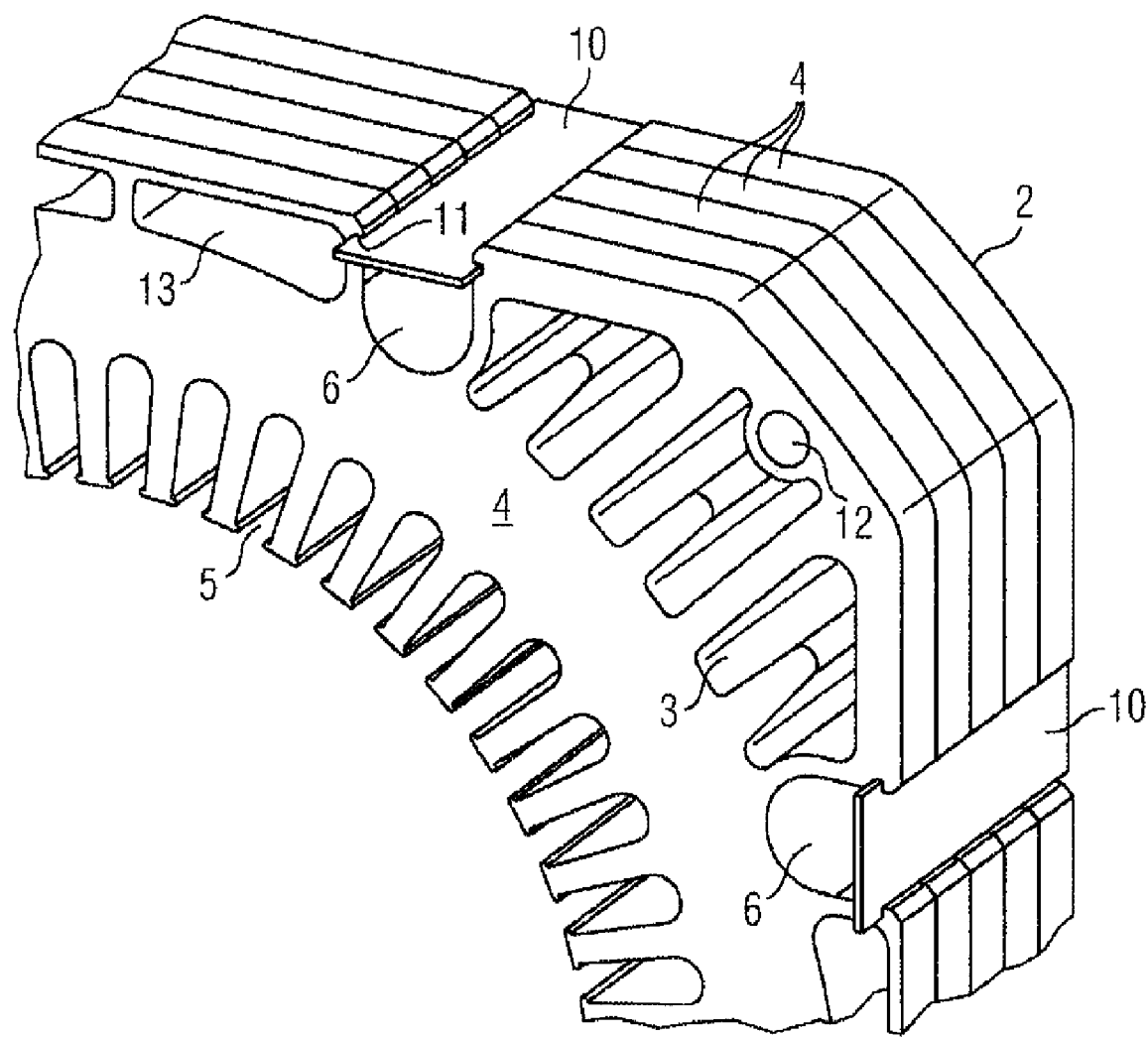

Further advantage characteristics of the invention result from their explanation with reference, by way of the example, to the FIGS., in which:

FIG. 1 shows an electrical machine 1 according to the prior art,

FIG. 2 shows a perspective view of a detail of a stator of an example of an electrical machine having two cutouts, which are in the form of grooves, on the outside of the stator, according to the invention, FIG. 3 shows the cutout in the stator of the example of an electrical machine as shown in FIG. 2 with cooling tubes which have been introduced into the cutouts which are in the form of grooves, and FIG. 4 shows the cutout in the stator of the example of an electrical machine as shown in FIG. 2 with cutouts which are in the form of grooves and have been closed by means of covers to form a cooling air duct, as well as a laminated embodiment of the stator according to the invention.

DETAILED DESCRIPTION OF PREFERRED EMBODIMENTS

FIG. 1 shows an electrical machine 1 according to the prior art. By way of example, the electrical machine 1 is an electric motor or a generator. The electrical machine 1 has a stator 2 and a rotor 20. By way of example, the stator 2 has a more or less square cross section, with the longitudinal edges of the stator 2 being highly chamfered.

An electrical machine 1 is normally laminated in order to avoid eddy current losses. This is also the case in the example shown in FIG. 4. The reference symbol 4 denotes a core laminate or motor laminate of the stator 2. A multiplicity of core laminates 4 are stacked in the axial direction of the electrical machine 1 to form a laminated core, and are clamped by means of a clamping assembly. Holes 12 are used to hold corresponding clamping screws, which are not shown in any more detail. A laminated core may have 100 or more core laminates.

The reference symbol 22 denotes a core laminate or motor laminate of the rotor 20. The laminated core of the rotor 20 is normally seated on an input or output drive shaft of the electrical machine 1, and is constructed analogously to the stator laminated core.

By way of example, rectangular and triangular cooling air ducts 3, 13 are provided in the corner area of the stator 2 and are formed by the corresponding cutouts in each core laminate 4 of a laminated core.

The reference symbols 5 and 23 denote stator and rotor slots into which the winding systems or solid copper bars can be introduced.

FIG. 2 shows a perspective view of a detail of a stator 2 of an example of an electrical machine 1 according to the invention, with two cutouts 6, which are in the form of grooves and run axially, on the outside of the stator. For illustration purposes, only one axial section of the stator 2 is shown. Furthermore, FIG. 2 shows a number of closed air ducts 3, 13 which are arranged along the circumference in the part of the stator 2 which is not magnetically active, in particular in the corner area of the stator 2.

According to one embodiment, the cutouts 6 have an essentially U-shaped cross section so that one cooling tube or one flexible cooling tube can in each case advantageously be introduced there in order to cool the electrical machine 1. The base 16 of the cutout 6 is preferably semicircular, as is shown in FIG. 2. According to one particular embodiment, the cross section of the cutouts 6 is geometrically matched to the cross section of the cooling tube or of the flexible cooling tube. In the case of a cooling tube, the cooling tube external diameter and the internal diameter of the semicircular base 16 approximately correspond. The cutout 6 which is in the form of a groove as shown in FIG. 2 has a maximum width in an area 7, which maximum width corresponds to the internal diameter of the semicircular base 16.

According to the invention, the cutouts 6 which are in the form of grooves can be closed by means of at least one cover 10 to form a cooling air duct. This is shown in detail in FIG. 4. According to one embodiment of the invention, the cutouts 6 may comprise slots 11, which run essentially axially, for insertion of these covers 10.

FIG. 3 shows a detail of the stator 2 of the example of the electrical machine 1 as shown in FIG. 2, with cooling tubes 9 having been introduced into the cutouts 6 which are in the form of grooves. The illustrated sections of the cooling tubes 9 have a circular cross section 8. As shown in FIG. 3 in this case, the cooling tubes 9 rest flush on the inside of the respective cutout 6 which is in the form of a groove. This ensures a particularly low thermal transfer resistance between the stator 2 and the cooling tube 9. Thermally conductive substances, such as thermally conductive paste or metal braids in the form of strips which are introduced between a cutout 6 and a cooling tube 9 or flexible cooling tube, can further reduce the heat transfer resistance.

According to one embodiment (see FIG. 3), the side areas 7 of a cutout 6 are formed by walls 15 whose thickness A is designed with thin walls such that a cooling tube 9 can be pressed into the respective cutout 6 in the mechanically elastic sense. The thickness A may be in the range from 0.5 mm to 2 mm, depending on the dimensions of the electrical machine 1 and depending on the diameter and tube wall thickness of the cooling tube 9 that is used.

According to one particular embodiment, the at least one cooling tube 9 or the at least one flexible cooling tube can be laid at least partially in a meandering shape on the outside of the stator 2 of the electrical machine 1. The cooling tube sections 9 illustrated in FIG. 3 may therefore also be one and the same cooling tube 9. For this purpose, the cooling tube 9 may have a 180° bend in the end area, whose diameter typically corresponds to the distance between the cooling tube sections 9 laid in the cutout 6 which are in the form of grooves.

FIG. 4 shows the detail of the stator 2 in the example of an electrical machine 1 as shown in FIG. 2 with cutouts 6, which are in the form of grooves and are closed by means of covers 10 to form a cooling air duct, as well as a laminated embodiment of the stator 2, according to the invention.

In a further embodiment in the example shown in FIG. 4, the covers 10 are in the form of strips. The cross section of the cutouts 6 is widened in the area of the outer edge by at least two mutually opposite further cutouts 11 which each form one slot 11. The provision of the slots 11 in the outer area of the stator 2 results in the illustrated covers 10 ending virtually flush with the outside of the stator, or with the surface of the stator 2.

FIG. 4 also shows the stator 2 which, according to a further embodiment, has a laminated core composed of a multiplicity of core laminates 4. The stator section shown in FIG. 4 has, by way of example, five core laminates 4.

According to the invention, a core laminate 4 has a circular cutout for a rotor 20, which is not illustrated in any more detail, for the electrical machine 1, and a multiplicity of stator slots 5. Furthermore, the core laminate 4 has cutouts 6 with a cross section in the form of a groove, on its outer edge 4. The cross section of the cutouts 6 is once again U-shaped, and in particular is semicircular. The semicircular section of the cutout 6 is located in an area opposite the outside of the stator 2.

According to a further embodiment, all the illustrated cutouts 5, 6, 11 are typically reduced by means of a stamping process or by means of a laser cutting process.

In summary, the invention relates to a cooling device for an electrical machine 1, in particular for an electric motor, having a stator 2 and a rotor 20. According to the invention, cutouts 6 which are in the form of grooves and run axially are provided on the outside of the stator 2, into which cutouts 6 a cooling tube 9 or a flexible cooling tube can be introduced, and/or which can be closed by means of a cover 10 to form a cooling air duct. The invention also relates to an electrical machine 1 having a cooling device such as this. The invention relates to a core laminate 4 for a laminated core of a stator 2, with the core laminate 4 having, inter alia, a multiplicity of stator slots 5 as well as cutouts 6 with a cross section in the form of a groove, on the outer edge. Furthermore, the invention relates to an electrical machine 1 whose stator 2 has a laminated core composed of a multiplicity of such core laminates 4. Finally, the invention relates to production methods for such electrical machines 1. The cooling tubes 9 or flexible cooling tubes are introduced into the half-open cutouts 6, which are in the form of grooves, for cooling from the outside.

The particular advantage of the invention is the simple design of the cooling device. The cooling tube 9 or the flexible cooling tube just needs to be snapped or pressed into the cutout 6 which are in the form of grooves. In the case of liquid cooling, leaky cooling tubes 9 or flexible cooling tubes can be replaced in a simple manner. In the event of a leak the cooling liquid can flow away over the outside of the stator in an unpressurized manner, and in consequence does not enter the interior of the electrical machine 1. In the case of air cooling, this advantageously results in a simple manner in cooling air ducts by the cutouts 6, which are in the form of grooves, being closed by means of a cover 10 to form a cooling air duct. One particular advantage is that a single type of the electrical machine 1 can be used both with liquid cooling, with air cooling and with a mixed cooling mode depending on the field of use.

What is claimed is:

1. A cooling device for an electrical machine having a stator and a rotor, with the stator formed with an essentially axial cutout in the form of a groove on the outside, wherein the cutout has side areas, each side area formed with an essentially axial slot extending outwardly from an end face of the side area, wherein the cutout is closeable by an axially displaceable cover which is insertable into the slot to span over the cutout and thereby form a cooling air duct, wherein the side areas of the cutout are formed by walls having a thickness sized to hold a cooling tube press-fittingly in the cutout in a mechanically elastic manner.

2. The cooling device of claim 1, wherein each said slot is arranged in close proximity to the outside of the stator.

3. The cooling device of claim 1, wherein the cover are shaped in the form of a strip.

4. The cooling device of claim 1, comprising at least a cooling tube or a flexible cooling tube for introduction into the cutout.

5. The cooling device of claim 1, wherein the cutout has a U-shaped cross section defined by parallel walls.

6. The cooling device of claim 4, wherein the cutout has a semicircular base and is defined by a cross section which geometrically complements a cross section of the cooling tube.

7. The cooling device of claim 6, wherein the cross section of the cooling tube is circular.

8. The cooling device of claim 1, wherein the side areas of the cutout are formed by walls having a thickness sized to allow the cooling tube to be pressed into the cutout in a mechanically elastic manner.

9. The cooling device of claim 4, wherein the cooling tube has at least a portion which extends in a meandering shape on the outside of the stator of the electrical machine.

10. An electrical machine, in particular an electric motor, comprising:
    a rotor;
    a stator interacting with the rotor and having an outside formed with an essentially axial cutout in the form of a groove, wherein the cutout has side areas, each side area formed with an essentially axial slot extending outwardly from an end face of the side area, wherein the cutout is closeable by an axially displaceable cover which is insertable into the slot to span over the cutout and
    a cooling tube held press-fittingly in the cutout in a mechanically elastic manner.

11. A production method for an electrical machine, with the electrical machine having a stator and a rotor, said method comprising the steps of:
    introducing essentially axial cutouts in the form of an open-topped U-shaped grooves on an outside of the stator;
    widening a cross section of each of the cutouts towards the outside by at least two slots in opposite relationship;
    holding a cooling tube in a press-fitting manner in each of the cutouts; and
    closing each of the cutouts by pushing a cover into the slots of the cutouts.

12. The method of claim 11, wherein the cooling tube has a portion which extends in a meandering shape in the cutouts.

13. The method of claim 11, wherein the introducing step is realized by a stamping or laser cutting process.

14. The method of claim 11, wherein the cooling tube has a diameter which corresponds substantially to a diameter of an entry opening of the U-shaped groove of the at least one cutout.

* * * * *